United States Patent [19]

Balaz

[11] 4,047,861
[45] Sept. 13, 1977

[54] EXTRUSION DIE WITH FIBRILLATING AIR NOZZLE

[75] Inventor: Alexander Balaz, Barrington, Ill.

[73] Assignee: The Quaker Oats Company, Chicago, Ill.

[21] Appl. No.: 615,310

[22] Filed: Sept. 22, 1975

Related U.S. Application Data

[63] Continuation of Ser. No. 478,758, June 12, 1974, abandoned.

[51] Int. Cl.[2] .......................... A23P 1/00; D01D 5/26
[52] U.S. Cl. ........................................... 425/7; 264/12; 264/DIG. 47
[58] Field of Search ............... 425/7, 72, 378, 379; 264/12, 146, 147, DIG. 47

[56] References Cited

U.S. PATENT DOCUMENTS

| 1,142,893 | 6/1915 | Laskey | 425/378 X |
|---|---|---|---|
| 1,281,592 | 10/1918 | Laskey | 425/378 X |
| 2,336,159 | 12/1943 | Bent | 425/72 X |
| 3,347,648 | 10/1967 | Krakauer et al. | 425/7 X |
| 3,502,757 | 3/1970 | Spencer | 425/378 X |
| 3,562,369 | 2/1971 | Chopra et al. | 425/379 X |
| 3,585,684 | 6/1971 | McIntosh et al. | 425/378 S X |

FOREIGN PATENT DOCUMENTS

| 238,739 | 8/1969 | U.S.S.R. | 425/72 S |

OTHER PUBLICATIONS

Wente, V. A., *Superfine Thermoplastic Fibers*, Industrial and Engineering Chemistry, pp. 1342-1346 (1956).

*Primary Examiner*—Robert D. Baldwin
*Attorney, Agent, or Firm*—Charles J. Hunter; Donnie Rudd; Richard H. Shear

[57] ABSTRACT

An apparatus for use as an extruder die is disclosed. The die comprises an inner housing surrounded by heating means. At one end of the housing is provided a gas projection means which is used to partially fibrillate the hot extrudate.

4 Claims, 2 Drawing Figures

EXTRUSION DIE WITH FIBRILLATING AIR NOZZLE

This is a continuation of application Ser. No. 478,758, filed June 12, 1974 now abandoned.

BACKGROUND OF THE INVENTION

1. Field of the Invention

This invention provides an extruder die which is capable of both fibrillating a plastic mass of material as well as cooling the material to prevent coalescence.

2. Description of the Prior Art

Fibrillation of plastic material is well known. When an extruded plastic-like material is to undergo fibrillation it is imperative that the plastic-like material be cooled as soon as possible to prevent any coalescence of the individual fibers created during the fibrillation process. In the past it has been very difficult to simultaneously fibrilate an extruded plastic-like mass while cooling the formed fibers sufficient to prevent such coalescence. The present invention, however, provides an extruder die which is capable of both fibrillating a plastic-like mass of material as well as cooling the material to prevent coalescence.

SUMMARY OF THE INVENTION

It is, therefore, an object of this invention to provide a novel apparatus for use as an extruder die.

Another object of the present invention is to provide means in conjunction with an extruder die for fibrillating a hot extrudate.

Yet another object of the present invention is to provide an apparatus capable of cooling a hot extrudate as it leaves the die.

Still another object of this invention is to provide a die which simultaneously fibrillates a plastic-like mass of material while it cools that material.

These and other objects of this invention are accomplished by providing an extruder die comprising an inner housing surrounded by an outer heating means. Adjacent to the outlet of the inner housing is provided a pair of gas injection means. By projecting a gas through said gas projection means into a hot extrudate flowing through the inner housing the extrudate can be fibrillated and cooled simultaneously.

BRIEF DESCRIPTION OF THE DRAWING

This invention may be more fully described but is not limited by the enclosed drawing wherein.

DETAILED DESCRIPTION OF THE INVENTION

In accordance with the novel aspects of the present invention an extruder die is provided that is capable of both cooling a hot extrudate while simultaneously fibrillating that extrudate to form a fibrous product.

More specifically, this fibrous product is produced by projecting a gas directly upon the hot extrudate as that extrudate exits from the extruder die. To obtain fibrillation it is necessary that the gas impinge upon the extrudate at a 45° angle to the direction of flow of the extrudate. Fibrillation produced in this manner would be highly beneficial in the formation of fibrillated plastic products as well as food products. If desired, however, fibrillation of the extrudate by the gas blasts can be prevented by lowering the pressure of the gas projection into the extrudate so that the gas will merely have a cooling effect upon the extrudate.

Figure 1:
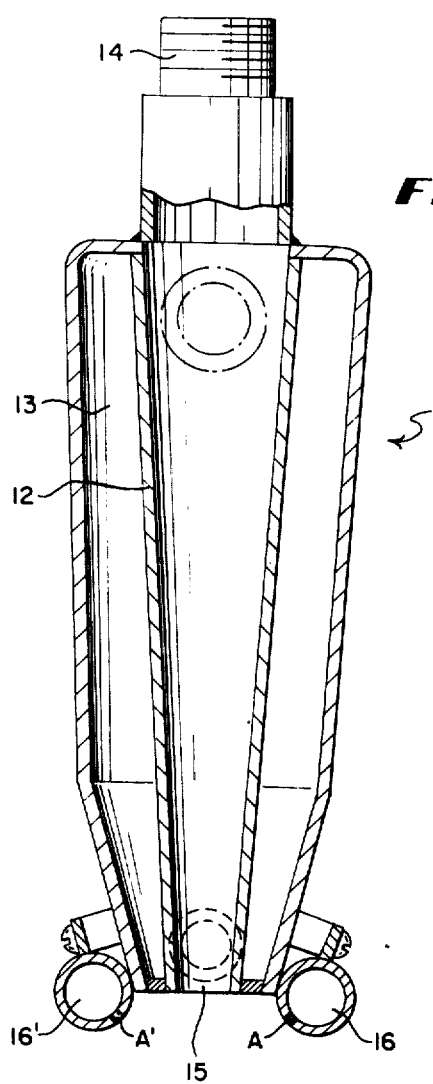
FIG. 1 is a cross-sectional side view of an extruder die having air injection means attached.

FIG. 1 is illustrative of a cross-sectional side view of a novel extruder die 11. The die is made up of three basic structures; the inner housing 12, the heating means 13, and the gas projection means 16 and 16'. At each end of the inner housing 12 is an opening. These openings are inner connected by a longitudinal bore. The opening at the upper portion of the housing acts as an inlet 14 while an opening at the lower portion of the housing acts as an outlet 15. The inlet 14 is capable of being connected to a means to blend a food or other plastic type material. Typically this means comprises a screw conveyor having a heated barrel. Engaged about the inner housing 12 is a heating means capable of maintaining the temperature within the die equal to that within the blending means. As shown in the figure the heating means may be an outer jacket 13 sealingly engaged about the inner housing. The outer jacket is provided with an inlet for the introduction of steam into said jacket and an outlet for the discharge of condensation. At the lower end of the heating jacket adjacent outlet 15 is provided gas projection means 16 and 16' parallel to one another. Typically these gas projection means are air pipes affixed to the outer heating jacket. These air pipes contain a plurality of orifices through which air may be projected onto the hot extrudate flowing through the inner housing 12. In order to provide fibrillation of the hot extrudate, these protrusions must be located so that air flowing through them will impinge upon the hot extrudate at an angle of 45° to the flow of that extrudate. This is illustrated by locating these protrusions at points A and A' of the air pipe.

Figure 2:
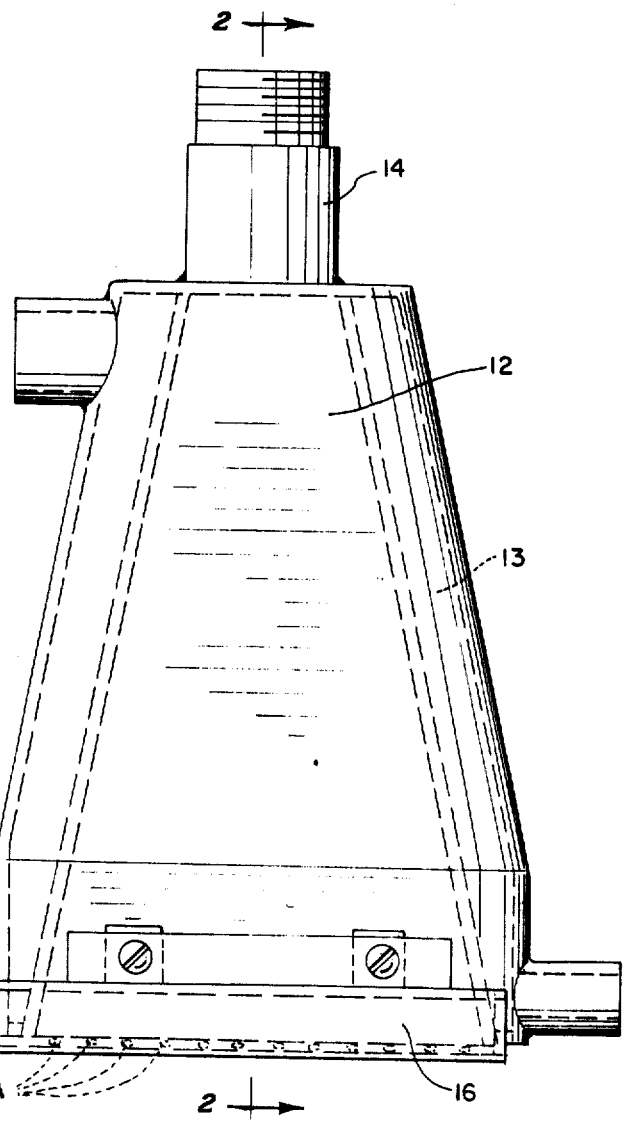
FIG. 2 is a cross-sectional front view of the extruder die illustrated in FIG. 1.

FIG. 2 merely illustrates the novel die from a somewhat different view than FIG. 1. The extruder die operates in the following manner. When the inlet 14 is connected with blending means the hot extrudate is forced through the inner housing 12. The inner housing may be heated by elevated temperature by the introduction of steam into the outer jacket. As the hot extrudate exits from the housing through outlet 15, air is projected through gas projection sources 16 and 16' so that the hot extrudate undergoes fibrillation as well as cooling. The amount of pressure required to fibrillate the hot extrudate is dependent upon the specific material comprising the extrudate. The temperature of the air required to cool the extrudate to prevent coalescence of the fibrillated product is also dependent upon the material comprising the extrudate. If the pressure is low enough, however, the hot extrudate can merely be cooled and fibrillation prevented.

Obviously modifications of this invention are possible. It is understood, therefore, that this application is intended to cover any variations, uses, or adaptations of the invention as may be considered to be known or customary practice in the art to which the invention pertains.

I claim:

1. A die utilized for simultaneously forming and cooling fibers in a hot food extrudate comprising:
   a. an outer heating means engaged about an inner housing and completely surrounding said inner housing;
   b. said inner housing having an inlet in the upper portion of said housing and an elongated outlet in the lower portion of said housing, said lower outlet having one opening;
c. a first gas injection means affixed to said outer heating means located adjacent one elongated side of said outlet, said first gas injection means comprises an air pipe having a plurality of three or more orifices, said air pipe being connected to a pressurized air source to project air through said orifices upon the hot extrudate flowing through said outlet;
d. a second gas injection means affixed to said outer heating means located adjacent the other elongated side of said outlet and parallel to said first gas injection means, said second gas injection means comprising an air pipe having a plurality of three or more orifices, said air pipe being connected to a pressurized air source to project air through said orifices upon the hot extrudate flowing through said outlet, said first and said second gas injection means being capable of forcing air into the hot extrudate to fibrillate it before it substantially cools and maintain it in a fiber state while cooling.

2. A die according to claim 1 wherein said first outer heating means comprises a heating jacket sealingly engaged about said inner housing and completely surrounding said inner housing.

3. A die according to claim 1 wherein said inlet is capable of connection with a screw conveyor.

4. A die according to claim 2 wherein the orifices in said air pipe are positioned so that the air flowing through said orifices impinges upon said extrudate flowing through said outlet at a 45° angle.

* * * * *